May 17, 1932.  G. R. BROWN ET AL  1,858,877

VALVE

Filed May 31, 1930

INVENTORS
George R. Brown
George F. Naab

BY Brockett, Hyde, Higley & Meyer

ATTORNEYS

Patented May 17, 1932

1,858,877

UNITED STATES PATENT OFFICE

GEORGE R. BROWN AND GEORGE F. NAAB, OF CLEVELAND, OHIO, ASSIGNORS TO THE NORTH AMERICAN MANUFACTURING COMPANY, OF CLEVELAND, OHIO, A CORPORATION OF OHIO

VALVE

Application filed May 31, 1930. Serial No. 457,743.

This invention relates to valves of the type particularly adapted for controlling gas components of mixtures for combustion.

Such a valve is usually employed in combination with an air valve to form therewith a "proportioning valve" unit; and the gas valve, as does the air valve, must have straight line opening and closing characteristics. In addition to simple opening and closing control, means must be provided for adjusting the valve to limit the flow allowed thereby when the valve is in open positions.

The object of this invention is to provide a simple means for the purpose and one which shall provide that the described straight line valve opening and closing characteristics are not affected by the described secondary adjustment.

Figure 1:
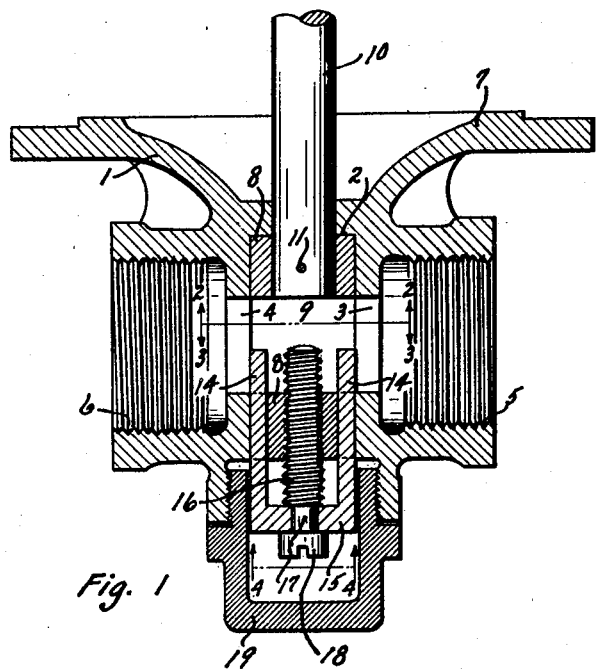
Figure 5:
Figure 2:
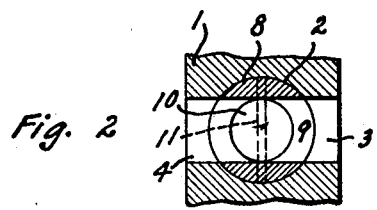
Figure 3:
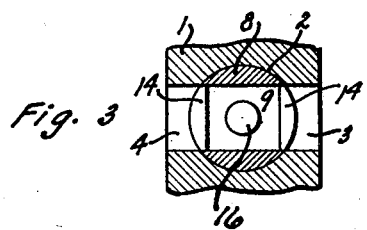
Figure 6:
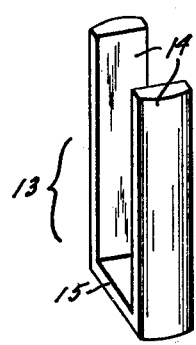
Figure 4:
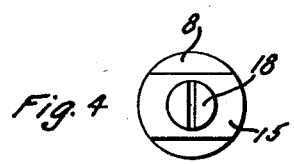

The exact nature of the invention together with further objects and advantages thereof will be apparent from the following description taken in connection with the accompanying drawings, in which Fig. 1 is a typical section through an embodiment of the invention, indicating the primary valve adjustment as full open but the secondary valve adjustment as about half-way open; Figs. 2 and 3 are transverse sections looking in opposite directions as on the line 2—2, 3—3, of Fig. 1; Fig. 4 is a view in the transverse plane of line 4—4, Fig. 1; and Figs. 5 and 6 are perspective views showing the two principal valve parts.

With reference now to the drawings, 1 is the valve body having a cylindrical valve chamber 2, with opposed lateral ports 3 and 4 of rectangular section opening thereinto. Opposite these ports the valve body is provided with threaded sockets 5 and 6 or other means for connection with inlet and outlet piping. The valve body casting may also include a flange 7 by which the described valve body, which is adapted for control of gas flow, may be secured with an air valve body for the purpose of forming a proportioning valve unit, all as shown in our copending application, Serial No. 365,368, filed May 23, 1929.

Within the valve chamber 2 is fitted a valve 8 having a through passage opening 9 of section corresponding with that of the ports 3 and 4; so that the valve 8 is rotatable in its chamber for controlling communication between the ports in the valve body, all in the usual manner. A stem 10 may be secured with the valve as by a pin 11 for so actuating the valve.

It will be obvious from the foregoing that a 90° rotation of the valve will move the same between fully open and fully closed positions; and that the opening and closing characteristics of the valve are what is known as straight line, that is, owing to the rectangular ports the proportion of flow will be directly as the proportion of angular valve opening movement.

In order that a secondary adjustment may be provided for the flow, we provide on the face of the valve 8 a pair of opposed grooves 12, each the width of the valve passage 9 and extending longitudinally from one of the mouths thereof, through to the end of the valves, as best shown Fig. 5. For cooperation with the valve we provide a yoke member 13 as shown Fig. 6, having a pair of legs 14 each adapted to fit in one of the grooves 12, the leg members being joined beyond the end of the valve by a transverse bridge member 15. The leg members 14 are of uniform section, and adapted for sliding fit in the openings defined by the grooves 12 and the corresponding side wall portions of the valve chamber 2. The proportion and arrangement of the parts is such that the yoke member 13 may be moved from the central position indicated Fig. 1, upwardly to close the valve passage opening 9 or downwardly to leave the passage unrestricted; the free extremities of the legs 14 thus acting as curtains at the mouths of the valve passage 9.

That such adjustment of the yoke member may be effected and maintained, we provide a screw 16 threaded into a central opening in the end of the valve 8; and associate the screw with the yoke member 13. To this end the screw is provided with a necked-down portion 17 fitting for rotation in an opening in the bridge 15, and a screw head 18 is secured on the projecting end of the screw as by a press fit as indicated. It will be obvious that by rotation of the screw, the yoke being held non-rotatable by the engagement of its legs with the valve, will be moved longitudinally relative to the valve.

The ends of the legs 14 being squared off, it will be apparent that regardless of the adjustment of either the valve 8 in its chamber, or of the yoke 13 upon the valve, any flow past the valve will be through rectangular openings. The end of the valve body 1 into which the yoke 13 projects is preferably closed by a cap 19 screw-threaded as indicated and of sufficient length to provide clearance for the yoke and the screw throughout their range of adjustment.

What we claim is:

Valve means of the class described, comprising a valve body having a cylindrical valve chamber with opposed lateral ports, a valve rotatable in said chamber for controlling communication between said ports, and having for the purpose a through transverse passage opening, the valve being provided on its face with a pair of opposed grooves, each extending longitudinally from one of the mouths of said opening, a yoke member having legs fitting for sliding movement in the openings defined by said grooves and the valve body, and having a transverse bridge joining said legs, and screw means associating said bridge with said valve to provide longitudinal adjustment of the yoke member on the valve.

In testimony whereof we hereby affix our signatures.

GEORGE R. BROWN.
GEORGE F. NAAB.